8035X
J. Henson.
Metallic Roof.
Patented Feb. 28, 1834.
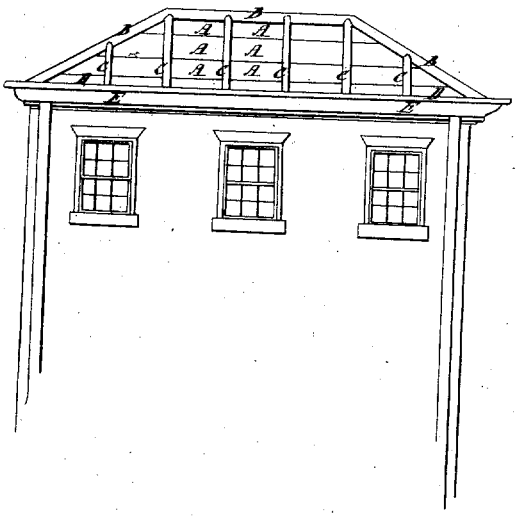
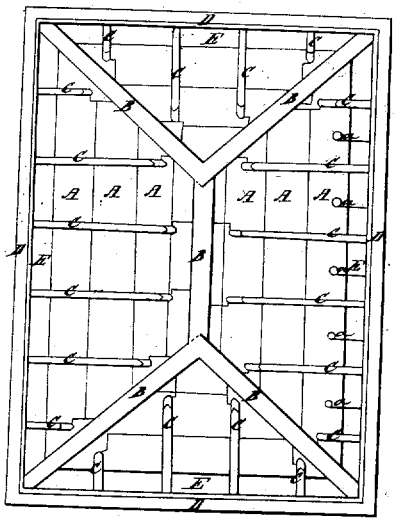
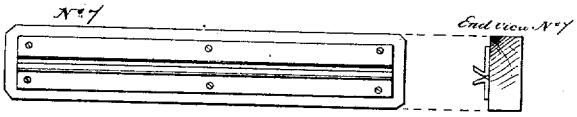
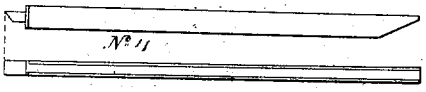
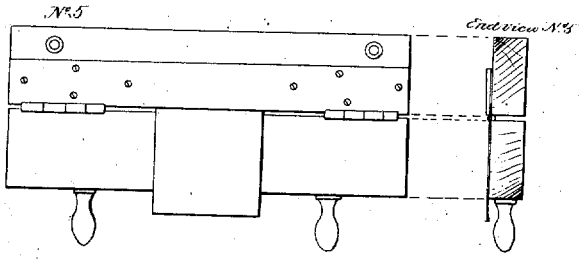
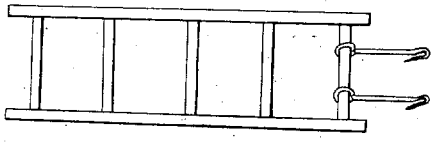
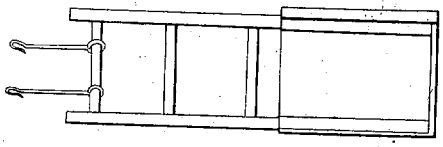
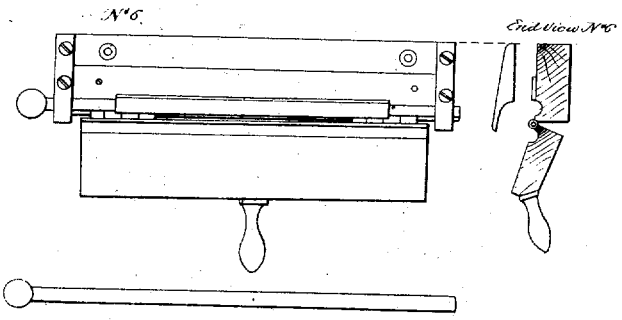
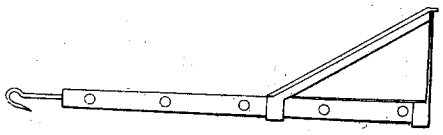
THE GRAPHIC CO. PHOTO-LITH. 39 & 41 PARK PLACE, N.Y.

No. 13
Feb. 28. 1834 579.

John Henson
Letters Patent

The Schedule referred to in these Letters Patent and making part of the same containing a description in the words of the said John Henson himself of his Improvement on fire & water tight roofs covered with tin or any other Metallic substance

---

To all to whom these presents shall come Be it known that I John Henson of Lexington Va. in the County of Rockbridge & State of Virginia have invented certain new improvements on the late patent obtained by C. Bonnycastle for constructing roofs covered with tin & other metals & have invented sundry tools & machinery for performing the work & that the following is a full & exact description of my improvement on the Bonnycastle patent & on the tools & machinery used to do the work which improvements tools & machinery were invented and improved by me. Fig 1st Represents a double lock spring circular comb on the top of the roof (in place of the small soldered elbows which unite the leads on the Bonnycastle roof) which is a perfect security against leakage & makes a more consistent & substantial finish to the work. It is constructed in the following manner, edges of one inch deep are laid off on the upper range of the tin or metal that the roof is covered with on each side to incline in opposite directions. Cramps of tin are introduced between to secret nail the covering at top. Then follows a flat spring cap secured by cramps let into the same & over the whole is sprung) a large circular tube to prevent any water entering under the covering. Figure the 2nd Represents the different small sheets of tin united securely lengthways by half inch grooves making as it were one continued sheet from the eve to the top of the comb or rafter doing away the necessity of lapping the sheet as on the Bonnycastle plan & thereby making the work perfectly water tight & leaving the sheets free for expansion or contraction which will naturally take place when the tin is in one large continued sheet and has no room to play in the joints. When the sun acts upon it each sheet shows a superfice to the weather when on the roof Drawing roof of 9 by 12 inches & no solder required to unite the same. Figure 3d Rep-
resents an improved mode of making the gutter at the eve showing how
it is secured to the rafters or planks under the tin without the aid of iron
spikes or tin or copper straps to secure it to the roof. thereby preventing the
injury such spikes & straps create by oxidizing with the tin & also securing
every drop of water that comes from the roof & preventing any passing between
the gutter & cornice. Where it will be observed the beads on the roof are extended
to the beads on the front of the gutter as a stay & support to it. The circular
front of the gutter is made 11 inches, the part that lays on the cornice 4 inches
the model will further explain. Figure 4 Represents one side of the model
covered so as to be fire proof on both sides. The rafters being made of inch
& half pine plank by 4 & an half inches deep & let into a [illegible] beam
at top & cornice plate below when over 10 or 12 feet long) transverse
pieces are let in of 2 inches deep. These rafters stand 11 inches apart from
each other & the tin is stretched over & the joints lock on the centre of the
rafter. The whole of this frame to support the tin is covered with sheet
tin, no sheathing plank is used. & the roof constructed in this way is per-
fectly substantial & fire proof on both sides affording firemen an
immediate entrance with their hose when it is necessary to introduce
it thro' the roof. Figure 5 Represents a machine to make the side & end
edges on the tin with certain improvements on it in the form of
an open butt hinge. model will explain to form the bead that unites
the joints to the roof. Figure 6 Represents a machine made of plank & sheet
iron to unite the beads in joints of 6 feet long. Plank 6 feet long 4-½
inches wide. 2 pieces of iron with edges to hold the bead during the sold-
ering. The model will explain Fig. 7. Represents a lot of chain ladders
made of plank to serve as scaffolds to put on a roof. The ladders are 6 feet
long 10 inches wide. 2 hooks of iron made thus Ƨ. are made to enter between
the joints on the shingle plank to take the upper round in each of the other
top rounds of the ladders 2 Ƨ hooks thus are inserted so that a chain of lad-
ders portable & light any length can in any instant be connected together
to put on a metallic roof without scaffolds Ex^d Witnesses William Payton
Ch S W. W. Stevens
John Hanson
806 1180